United States Patent
Hayakawa et al.

(10) Patent No.: US 9,551,518 B2
(45) Date of Patent: Jan. 24, 2017

(54) AUTOMOTIVE AIR CONDITIONER AND EXPANSION VALVE

(71) Applicant: TGK CO., LTD., Tokyo (JP)

(72) Inventors: Satoshi Hayakawa, Tokyo (JP); Akihiko Yamamoto, Tokyo (JP); Ryouta Sugamura, Tokyo (JP); Masaaki Tonegawa, Tokyo (JP); Toshiyuki Shiota, Tokyo (JP); Shinji Saeki, Tokyo (JP); Takeshi Kaneko, Tokyo (JP); Takanao Kumakura, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 315 days.

(21) Appl. No.: 14/256,885

(22) Filed: Apr. 18, 2014

(65) Prior Publication Data

US 2014/0318164 A1 Oct. 30, 2014

(30) Foreign Application Priority Data

Apr. 24, 2013 (JP) .................................. 2013-091664

(51) Int. Cl.
*F25B 41/04* (2006.01)
*B60H 1/00* (2006.01)
*B60H 1/32* (2006.01)

(52) U.S. Cl.
CPC ......... *F25B 41/043* (2013.01); *B60H 1/00485* (2013.01); *B60H 1/00921* (2013.01);
(Continued)

(58) Field of Classification Search
CPC .............. F25B 41/043; B60H 1/00485; B60H 1/00921; B60H 2001/3254; B60H 2001/3264; B60H 2001/3285; B60H 2001/3297

(Continued)

(56) References Cited

U.S. PATENT DOCUMENTS

| 2004/0112974 A1* | 6/2004 | Law ..................... F16L 41/082 236/92 B |
| 2013/0118200 A1 | 5/2013 | Aoun et al. .......... B60H 1/3213 |
| 2013/0186131 A1 | 7/2013 | Guitar .................. F25B 41/003 |

FOREIGN PATENT DOCUMENTS

| DE | 2709534 A1 | 9/1977 | ............... B60H 3/00 |
| EP | 2572910 A1 | 3/2013 | ............... B60H 1/22 |

(Continued)

OTHER PUBLICATIONS

European Search Report, EP14165426, Jul. 30, 2014; Munich; EPO Communication Aug. 6, 2014.

*Primary Examiner* — Marc Norman
(74) *Attorney, Agent, or Firm* — Martine Penilla Group, LLP

(57) ABSTRACT

A first expansion valve is provided in a first refrigerant circulation passage through which the refrigerant discharged from a compressor is able to circulate by passing sequentially through an external heat exchanger and an evaporator and returning to the compressor. A second expansion valve is provided in a second refrigerant circulation passage through which the refrigerant discharged from the compressor is able to circulate by passing sequentially through an auxiliary condenser and the external heat exchanger and returning to the compressor. The second expansion valve regulates the valve opening degree such that the refrigerant state at an inlet side of the compressor during a heating operation is in a range where the dryness of refrigerant is greater than or equal to 0.9 and the superheat of refrigerant is less than or equal to 5° C.

13 Claims, 11 Drawing Sheets

(52) U.S. Cl.
CPC ........... *B60H 2001/3254* (2013.01); *B60H 2001/3264* (2013.01); *B60H 2001/3285* (2013.01); *B60H 2001/3297* (2013.01)

(58) Field of Classification Search
USPC .................................. 62/205, 225; 236/92 B
See application file for complete search history.

(56) References Cited

FOREIGN PATENT DOCUMENTS

| FR | WO 2011117207 A1 | 9/2011 | ............. F25B 41/04 |
| FR | 2963665 A1 | 2/2012 | |
| FR | 2978534 A1 | 2/2013 | ............. F25B 29/00 |
| JP | 2009166629 | 7/2009 | ............. B60H 1/22 |
| JP | WO 2012120843 A1 | 9/2012 | ............. F25B 41/06 |

\* cited by examiner

FIG.2A
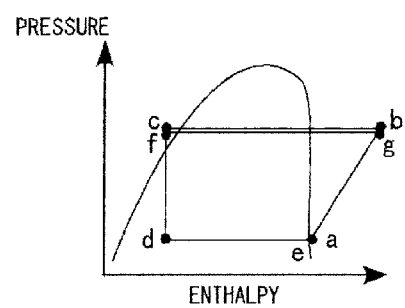
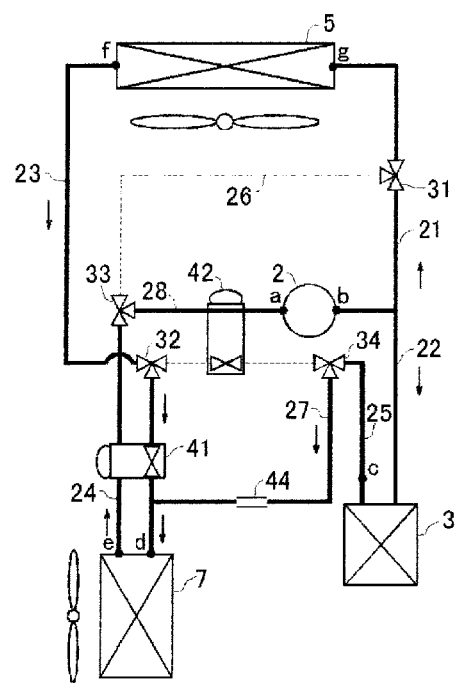
FIG.2B
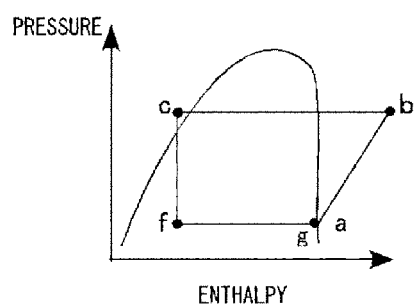
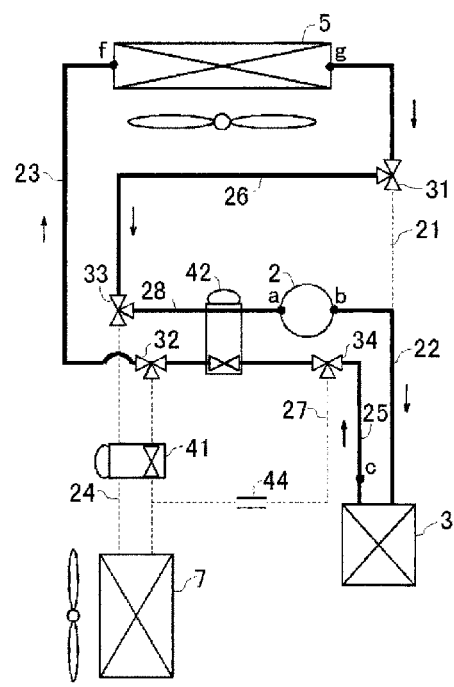

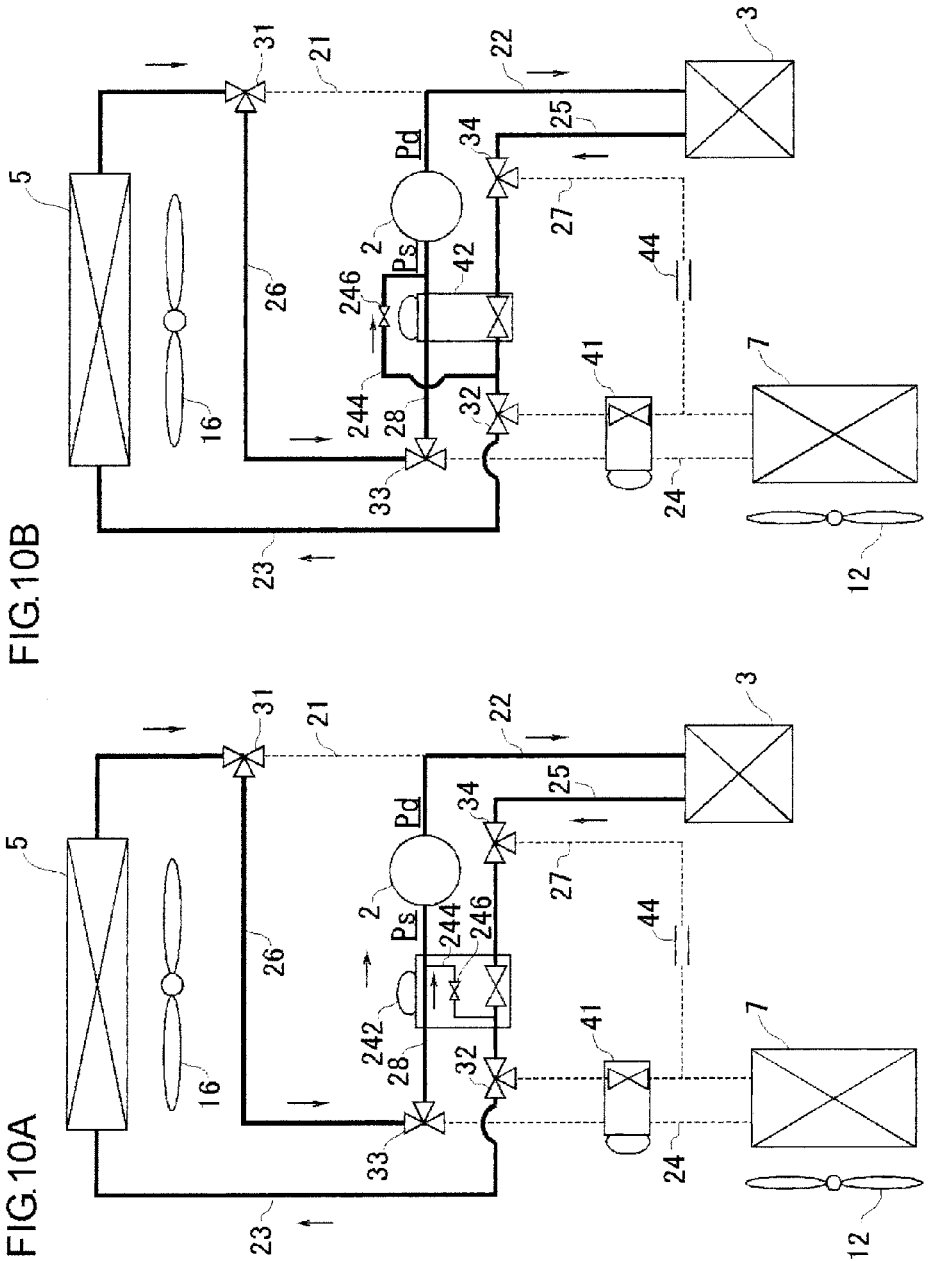

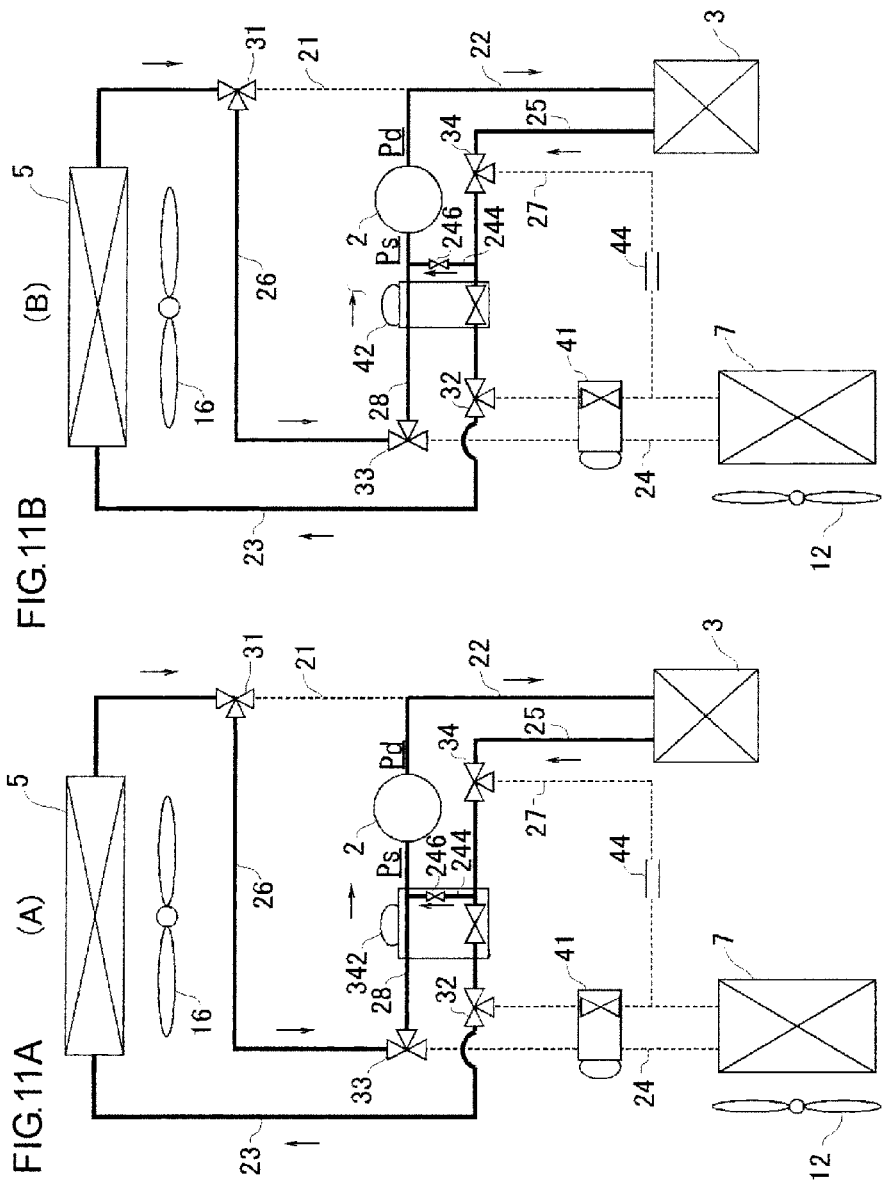

AUTOMOTIVE AIR CONDITIONER AND EXPANSION VALVE

CLAIM OF PRIORITY TO RELATED APPLICATION

The present application is claiming priority of Japanese Patent Application No. 2013-091664, filed on Apr. 24, 2013, the content of which is incorporated herein by reference.

BACKGROUND OF THE INVENTION

1. Field of the Invention

The present invention relates to an automotive air conditioner of heat pump type and an expansion valve used for said automotive air conditioner.

In recent years the combustion efficiency of a vehicle provided with an internal-combustion engine has improved. This makes it hard for the cooling water, used as a heat source, to rise to a temperature required for the heating. At the same time, the utilization rate of an internal-combustion engine is low in a hybrid vehicle equipped with both an internal-combustion engine and an electric motor. This makes it harder for such the cooling water to be utilized. For an electric-powered car, there is no heat source coming from any internal-combustion engine at all. For this reason, proposed is an automotive air conditioner of heat pump type (see Patent Document 1, for instance). In this proposed automotive air conditioner of heat pump type, a cycle operation using a refrigerant is carried out not only for the cooling but also for the heating, and a vehicle's passenger compartment can be dehumidified and heated.

Such an automotive air conditioner as described above employs a refrigeration cycle including a compressor, an external heat exchanger, an evaporator, an internal heat exchanger and so forth. The functions of the external heat exchanger are switched between when the air conditioner is in a heating operation and when it is in a cooling operation. At the time the air conditioner is in a heating operation, the external heat exchanger functions as an evaporator. At this time, the internal heat exchanger radiates heat in a process where the refrigerant circulates in the refrigeration cycle, and the thus radiated heat heats air inside the passenger compartment. At the time the air conditioner is in a cooling operation, the external heat exchanger functions as a condenser. At this time, the refrigerant condensed by the external heat exchanger is evaporated by the evaporator and, the evaporative latent heat cools the air of the interior of the vehicle. In so doing, the air in the passenger compartment is also dehumidified.

RELATED-ART DOCUMENT

Patent Document (1) Japanese Unexamined Patent Application Publication (Kokai) No. 2009-166629.

In such an automotive air conditioner, an accumulator is generally provided between the compressor and the evaporator (the "accumulator 27" shown in FIG. 1 of Patent Document 1). The accumulator, which has a gas phase unit and a liquid phase unit, is an apparatus where the refrigerant sent out from the evaporator is separated into gas and liquid and then stored. Thus, even if a liquid refrigerant that exceeds an expected amount is delivered from the evaporator, such an extra liquid refrigerant can be stored in the liquid phase unit, so that the refrigerant in the gas phase unit can be sent to the compressor. As a result, a so-called "liquid back-flow" problem where the liquid refrigerant, which is unintentionally returned to the compressor, hinders a compression operation can be resolved.

The installation of such an accumulator involves several problems. First, there is a problem of an installation space. To achieve a structure where the refrigerant is gas-liquid separated, the accumulator requires a relatively large volume. Thus, a space-related problem is likely to occur in a vehicle, such as an electric-powered car or hybrid vehicle in particular, which has a large number of electrical components and the like. Next, there is a problem of pressure loss in the accumulator. Since the pressure loss occurs when the refrigerant passes through the accumulator, the evaporating pressure of the evaporator relative to the suction pressure of the compressor increases by a pressure associated with the pressure loss. Since the increase in the evaporating pressure leads to an increase of evaporating temperature, it decreases the endothermic energy amount and thereby causes the heating capacity to drop. When, in particular, the ambient temperature of the vehicle is very low (e.g., −20° C. to −10° C.), the slope of the tangent of a saturated vapor pressure curve (temperature-pressure characteristics) is small and therefore the pressure loss in the accumulator has possibly a large impact on the evaporating temperature. Further, a so-called "stagnation and accumulation of refrigerant" problem arises in the accumulator and therefore a certain room for margin must be left for a filling amount of refrigerant in consideration of this problem. This increases the overall cost.

In order to resolve or alleviate this problem, it may be conceivable that the accumulator be removed. In such a case, however, control needs to be performed such that that the refrigerant having a suitable degree of superheat be supplied to the compressor. In this regard, an expansion valve is provided between the internal heat exchange and the external heat exchange and, therefore, a superheat controlling function by an expansion valve may be expected during a heating operation. Nevertheless, the inventors of the present invention had verified that it would be difficult to supply the refrigerant having a suitable degree of superheat to the compressor by merely applying a cooling expansion valve used in a normal refrigeration cycle.

SUMMARY OF THE INVENTION

One of purposes of the present invention is to provide an automotive air conditioner capable of properly maintaining the heating capacity during a heating operation, without provision of the accumulator.

DISCLOSURE OF INVENTION

Problems to be Solved by the Invention

In order to resolve the aforementioned problems, an automotive air conditioner according to one embodiment of the present invention includes: a compressor configured to compress refrigerant and discharge the compressed refrigerant; an external heat exchanger configured to function as an external condenser that radiates heat off the refrigerant during a cooling operation and configured to function as an external evaporator that evaporates the refrigerant during a heating operation; an internal evaporator configured to evaporate the refrigerant; an auxiliary condenser configured to radiate heat off the refrigerant separately from the external heat exchanger; a first refrigerant circulation passage through which, during the cooling operation, the refrigerant discharged from the compressor is able to circulate by passing sequentially through the external condenser and the internal evaporator and returning to the compressor; a second refrigerant circulation passage through which, during the heating operation, the refrigerant discharged from the compressor is able to circulate by passing sequentially through the auxiliary condenser and the external evaporator and returning to the compressor; a first expansion valve, provided in the first refrigerant circulation passage, configured to throttle and expand the refrigerant introduced from the external condenser and configured to be able to deliver the throttled and expanded refrigerant to the internal evaporator; and a second expansion valve, provided in the second refrigerant circulation passage, configured to throttle and expand the refrigerant introduced from the auxiliary condenser and configured to be able to deliver the throttled and expanded refrigerant to the external evaporator. The second expansion valve regulates a valve opening degree such that a refrigerant state at an inlet side of the compressor during the heating operation is in a range where dryness is greater than or equal to 0.9 and superheat is less than or equal to 5° C.

By employing this embodiment, regulating the valve opening degree of the second expansion valve allows the state of refrigerant at an inlet side of the compressor during a heating operation to be in a proper state. Hence, provision of an accumulator is no longer necessary. As a result, the aforementioned space-related problem for the installation of the accumulator, the problem concerning the drop in the heating capacity and the problem concerning the filling amount of refrigerant can be all resolved. In particular, the refrigerant state at the inlet side of the compressor during a heating operation is controlled such that the dryness of refrigerant is greater than or equal to 0.9 and the superheat thereof is less than or equal to 5° C. Thus, the heating capacity can be maintained at a high level while the liquid back-flow problem is resolved or alleviated, as will be later described in the detailed description of embodiments.

Another embodiment of the present invention relates to an expansion valve. The expansion valve is applied to an automotive air conditioner, and the automotive air conditioner includes: a compressor for compressing refrigerant and discharging the compressed refrigerant; an external heat exchanger that functions as an external evaporator, which radiates heat off the refrigerant during a heating operation; an auxiliary condenser for radiating heat off the refrigerant separately from the external heat exchanger; and a refrigerant circulation passage through which, during the heating operation, the refrigerant discharged from the compressor is able to circulate by passing sequentially through the auxiliary condenser and the external heat exchanger and returning to the compressor. The expansion valve is capable of throttling and expanding the refrigerant introduced from the auxiliary condenser and capable of delivering the throttled and expanded refrigerant to the external heat exchanger, and the expansion valve is configured as a thermostatic expansion valve, employing a normal charge method, which regulates a flow rate of the refrigerant flowing from the auxiliary condenser to the external heat exchanger, through an opening degree of a valve section. The thermostatic valve of the normal charge method includes: a temperature-sensing section that senses temperature and pressure of the refrigerant flowing from the external heat exchanger to the compressor so as to generate a drive force; and the valve section through which an opening degree is regulated by the drive force of the temperature-sensing section. The expansion valve autonomously operates such that a range of superheat sensed by the temperature-sensing section lies within 0° C. to 2° C. (both inclusive).

By applying the expansion valve of this embodiment to the above-described automotive air conditioner, regulating the valve opening degree of this expansion valve allows the state of refrigerant at the inlet side of the compressor during a heating operation to be in a proper state. This eliminates the necessity of provision of an accumulator. In particular, the range of superheat sensed by the temperature-sensing section is set between 0° C. and 2° C. This makes it easy to perform control such that the refrigerant state at the inlet side of the compressor during a heating operation is in a range where the dryness of refrigerant is greater than or equal to 0.9 and the superheat thereof is less than or equal to 5° C. As a result, the heating capacity can be maintained at a high level while the liquid back-flow problem is resolved or alleviated, as will be later described in the detailed description of embodiments.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIGS. 2A and 2B are each a diagram for explaining an operation of an automotive air conditioner;

FIGS. 10A and 10B each illustrates a system structure of an automotive air conditioner according to a modification; and FIGS. 11A and 11B each illustrates a system structure of an automotive air conditioner according to another modification.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

The present invention will now be described in detail based on preferred embodiments with reference to the accompanying drawings.

First Embodiment

Figure 1:
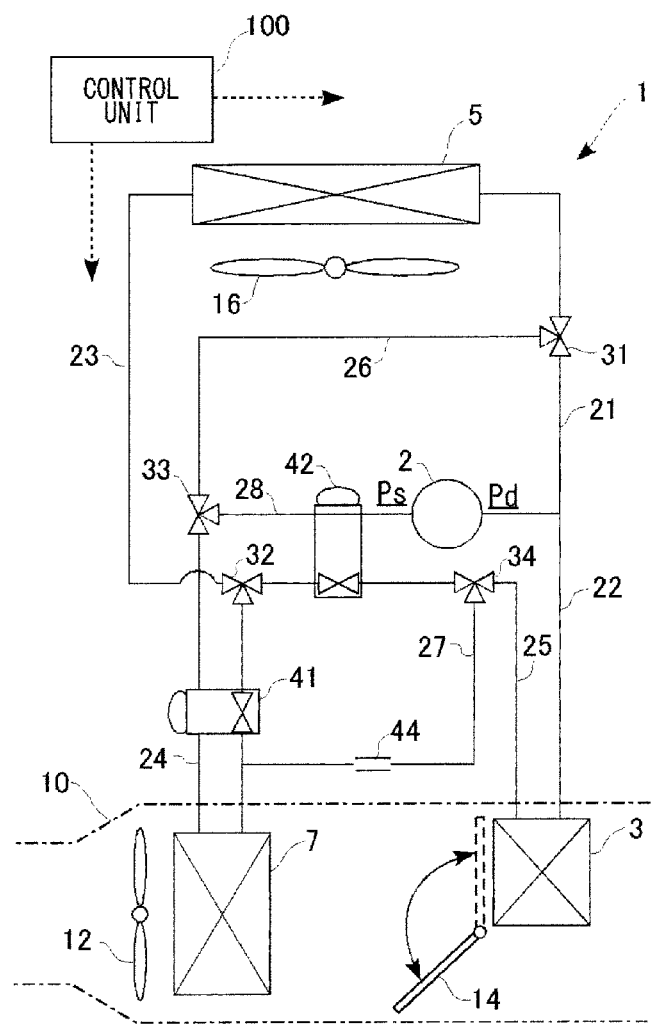
FIG. 1 illustrates a system structure of an automotive air conditioner according to a first embodiment.

FIG. 1 illustrates a system structure of an automotive air conditioner according to a first embodiment. The automotive air conditioner is a constructive reduction to practice of the present invention as an air conditioner of an electric-powered vehicle.

An automotive air conditioner 1 is provided with a refrigeration cycle (refrigerant circulation circuit). In this refrigeration cycle, a compressor 2, an auxiliary condenser 3 (internal heat exchanger), an external heat exchanger 5, and an evaporator 7 are connected to each other by piping. No accumulator is provided in the present embodiment. The automotive air conditioner 1 is configured as a heat pump type air conditioner that performs air conditioning inside a vehicle's passenger compartment using the heat of refrigerant in a process where hydrochlorofluorocarbon (HFC-134a, HFO-1234yf or the like), which is used as the refrigerant, circulates within the refrigeration cycle while the refrigerant changes its state.

The compressor 2 and the external heat exchanger 5 are provided outside a vehicle's passenger compartment. That is, the compressor 2 and the external heat exchanger 5 are installed in an engine room. On the other hand, a duct 10, in which air is heat-exchanged, is provided inside the passenger compartment. The evaporator 7 is provided upstream of air flow in the duct 10, whereas the auxiliary condenser 3 is provided downstream thereof. The auxiliary condenser 3 is configured as an internal condenser.

The automotive air conditioner 1 is operated such that a plurality of refrigerant circulation passages are switched between the heating operation and the cooling operation. This refrigeration cycle is configured such that the auxiliary condenser 3 and the external heat exchanger 5 are operable in parallel with each other as a condenser. Also, the refrigeration cycle is configured such that the evaporator 7 and the external heat exchanger 5 are switchable as an evaporator. A first refrigerant circulation passage, where the refrigerant circulates at the time of cooling, a second refrigerant circulation passage, where the refrigerant circulates at the time of heating, and a third refrigerant circulation passage, where the refrigerant circulates at the time of dehumidification, are formed in the refrigeration cycle.

In the first refrigerant circulation passage, the refrigerant circulates in the following order: the compressor 2→the external heat exchanger 5→the evaporator 7→the compressor 2. In the second refrigerant circulation passage, the refrigerant circulates in the following order: the compressor 2→the auxiliary condenser 3→the external heat exchanger 5→the compressor 2. In the third refrigerant circulation passage, the refrigerant circulates in the following order: the compressor 2→the auxiliary condenser 3→the evaporator 7→the compressor 2. The flow of refrigerant flowing through the external heat exchanger 5 is opposite in direction between the first refrigerant circulation passage and the second refrigerant circulation passage.

More specifically, a passage connecting to a discharge chamber of the compressor 2 is branched off into two passages. A first passage 21, which constitutes one of the branched-off passages, connects to one of ports of the external heat exchanger 5. And a second passage 22, which constitutes the other of the branched-off passages, connects to an inlet of the auxiliary condenser 3. The other of ports of the external heat exchanger 5 connects to an inlet of the evaporator 7 via a third passage 23. An outlet of the evaporator 7 connects to an inlet (suction port) of the compressor 2 via a fourth passage 24 (return passage). The first passage 21, the third passage 23 and the fourth passage 24 constitute the first refrigerant circulation passage.

An outlet of the auxiliary condenser 3 connects to the third passage 23 via a fifth passage 25. The first passage 21 is branched off midway into a bypass passage 26, and the bypass passage 26 connects to an inlet of the compressor 2. Further, the fifth passage 25 is branched off midway into a bypass passage 27, and the bypass passage 27 connects to the third passage 23. The second passage 22, the fifth passage 25, the third passage 23 and the bypass passage 26 constitute the second refrigerant circulation passage. Also, the second passage 22, the fifth passage 25, the bypass passage 27, the third passage 23 and the fourth passage 24 constitute the third refrigerant circulation passage. The first refrigerant circulation passage and the third refrigerant circulation passage form a parallel circulation passage where the auxiliary condenser 3 and the external heat exchanger 5 are connected in parallel with respect to the compressor 2 during a cooling operation. A common passage 28, which is a common passage of the first to third refrigerant circulation passages, is formed downstream of a merging point with the bypass passage 26 in the fourth passage 24.

A first control valve 31 is provided at a branch point of the first passage 21 at one end of the bypass passage 26. A second control valve 32 is provided at a merging point of the third passage 23 and the fifth passage 25. A third control valve 33 is provided at a merging point of the fourth passage 24 and the bypass passage 26. A fourth control valve 34 is provided at a branch point of the fifth passage 25 at one end of the bypass passage 27. The control valves 31 to 34 each functions as a switching valve for switching the flows of refrigerant at a merging point or a branch point between a plurality of refrigerant circulation passages. Note that the fourth control valve 34 also functions as a proportional valve that regulates the flow rates of refrigerant flowing from the fifth passage 25 to the third passage 23 and the bypass passage 27 at the time of heating and dehumidification.

The first control valve 31 is a three-way valve comprised of a first valve section for opening and closing the first passage 21, a second valve section for opening and closing the bypass passage 26 and an actuator for driving each of the first and second valve sections. Opening and closing the first valve section permits and blocks the flow of refrigerant from the compressor 2 to the external heat exchanger 5, respectively. Opening and closing the second valve section permits and blocks the flow of refrigerant from the external heat exchanger 5 to the bypass passage 26, respectively. In the present embodiment, an electromagnetic valve capable of switching the opening and the closing of each valve section by turning on and off a solenoid, respectively, is used as the first control valve 31. Instead, an electromagnetic valve capable of switching the opening and the closing of each valve section by driving a stepping motor may be used as the first control valve 31.

The second control valve 32 is a three-way valve comprised of a first valve section for opening and closing the third passage 23, a second valve section for opening and closing the fifth passage 25 and an actuator for driving each of these first and second valve sections. Opening and closing the first valve section permits and blocks the flow of refrigerant from the external heat exchanger 5 to the evaporator 7, respectively. Opening and closing the second valve section permits and blocks the flow of refrigerant from the auxiliary condenser 3 to the external heat exchanger 5, respectively. In the present embodiment, an electromagnetic valve is used as the second control valve 32. Instead, an electromagnetic valve driven by a stepping motor or the like may be used as the second control valve 32.

The third control valve 33 is a three-way valve comprised of a first valve section for opening and closing the fourth passage 24, a second valve section for opening and closing the bypass passage 26 and an actuator for driving each of these first and second valve sections. Opening and closing the first valve section permits and blocks the flow of refrigerant from the evaporator 7 to the compressor 2 via the common passage 28, respectively. Opening and closing the second valve section permits and blocks the flow of refrigerant from the bypass passage 26 to the compressor 2 via the common passage 28, respectively. In the present embodiment, an electromagnetic valve is used as the third control valve 33. Instead, an electromagnetic valve driven by a stepping motor or the like may be used as the third control valve 33.

The fourth control valve 34 is a three-way valve comprised of a first valve section for regulating the opening degree of the fifth passage 25, a second valve section for opening the opening degree of the bypass passage 27 and an actuator for driving each of these first and second valve sections. Opening and closing the first valve section permits and blocks the flow of refrigerant from the auxiliary condenser 3 to the external heat exchanger 5, respectively. Opening and closing the second valve section permits and blocks the flow of refrigerant from the auxiliary condenser 3 to the evaporator 7 via the bypass passage 27, respectively. Also, the flow rate of refrigerant from the auxiliary condenser 3 to the external heat exchanger 5 and that from the auxiliary condenser 3 to the evaporator 7 can be regulated by regulating the ratio of opening degree of the first valve section and that of the second valve. In the present embodiment, an electromagnetic valve is used as the fourth control valve 34. Instead, an electromagnetic valve driven by a stepping motor or the like may be used as the fourth control valve 34. In a modification, the fourth control valve 34 may be configured such that the opening degree of the first section and that of the second valve section can be regulated independently of each other.

An expansion valve 41 (functioning as a "first expansion valve") is provided in the first refrigerant circulation passage. The expansion valve 41 throttles and expands the refrigerant led out from the external heat exchanger 5 (an external condenser) and then supplies the throttled and expanded refrigerant to the evaporator 7, during a cooling operation. The expansion valve 41 is a thermostatic expansion valve, employing a normal charge method, which senses the temperature and the pressure of refrigerant flowing from the evaporator 7 to the compressor 2 and thereby operates autonomously and which regulates the flow rate of refrigerant flowing from the external heat exchanger 5 to the evaporator 7. The expansion valve 41 has a first internal passage, which constitutes part of the third passage 23, a second internal passage, which constitutes part of the fourth passage 24, a valve section, which is provided in the first internal passage, and a temperature-sensing section, which senses the temperature of refrigerant flowing through the second internal passage.

An expansion valve 42 (functioning as a "second expansion valve") is provided in the second refrigerant circulation passage. The expansion valve 42 throttles and expands the refrigerant led out from the auxiliary condenser 3 and then supplies the throttled and expanded refrigerant to the external heat exchanger 5 (external evaporator), during a heating operation. The expansion valve 42 is a thermostatic expansion valve, employing the normal charge method, which senses the temperature and the pressure of refrigerant flowing from the external heat exchanger 5 to the compressor 2 and thereby operates autonomously and which regulates the flow rate of refrigerant flowing from the auxiliary condenser 3 to the external heat exchanger 5. The expansion valve 42 has a first internal passage, which constitutes part of the fifth passage 25, a second internal passage, which constitutes part of the common passage 28, a valve section, which is provided in the first internal passage, and a temperature-sensing section, which senses the temperature of refrigerant flowing through the second internal passage.

An orifice 44, which is used to restrict the flow rate of refrigerant flowing from the auxiliary condenser 3 to the evaporator 7 during a dehumidification operation, is provided in the bypass passage 27.

An internal air blower 12, the evaporator 7 and the auxiliary condenser 3 are provided in this order starting from an upstream side of air flow in the duct 10. An air mix door 14, which is rotatably provided upstream of the auxiliary condenser 3, regulates the ratio of the volume of air flow passing through the auxiliary condenser 3 and that of air flow bypassing the auxiliary condenser 3. An external air blower 16 is so arranged as to face the external heat exchanger 5.

The compressor 2 is configured as a motor compressor that houses a motor and a compression mechanism within a housing. The compressor 2, which is driven by the current supplied from a not-shown battery, varies the refrigerant discharging capacity in response to the rotational speed of the motor. Various types of compressors including a reciprocal type, a rotary type and a scroll type may be used as the compressor 2. The motor compressor itself is publicly known and therefore the description thereof is omitted here.

The auxiliary condenser 3, which is provided inside the vehicle's passenger compartment, functions as an internal condenser that radiates heat off the refrigerant separately from the external heat exchanger 5. That is, the heat is radiated when the high-temperature and high-pressure refrigerant discharged from the compressor 2 passes through the auxiliary condenser 3. The air that has been divided in response to the opening degree of the air mix door 14 is heat-exchanged in a process where the air passes through the auxiliary condenser 3.

The external heat exchanger 5, which is installed outside the passenger compartment, functions as an external condenser that radiates heat off the refrigerant passing through the inside during a cooling operation. On the other hand, the external heat exchanger 5 functions as an external evaporator that evaporates the refrigerant passing through the inside during a heating operation. The external air blower 16 is a suction type air blower that introduces outside air by rotating and driving an axial flow fan by motor. The external heat exchanger 5 performs heat exchange between the outside air and the refrigerant.

The evaporator 7, which is installed inside the passenger compartment, functions as an internal evaporator that evaporates the refrigerant passing through the inside. That is, the low—temperature and low-pressure refrigerant having passed through an expansion valve 41 evaporates as the refrigerant passes through the evaporator 7. The air led from an upstream side of the duct 10 is cooled by the evaporative latent heat. At this time, the cooled and dehumidified air is divided into air that passes through the auxiliary condenser 3 and air that bypasses the auxiliary condenser 3, according to the opening degree of the air mix door 14. The air passing through the auxiliary condenser 3 is heated in this process of passing therethrough. At a downstream side of the auxiliary condenser 3, the air that has passed through the auxiliary condenser 3 and the air that has bypassed the auxiliary condenser 3 are mixed together and regulated to a target temperature, and then supplied into the passenger compartment through an air outlet (not shown). For example, the air is blown out from outlets such as a vent air outlet, a foot air outlet, and a defroster air outlet into a predetermined place of the passenger compartment.

The automotive air conditioner 1 configured as described above is controlled by a control unit 100. The control unit 100 computes a controlled variable of each actuator in order to attain a room temperature set by a driver or a passenger of the vehicle and then outputs a control signal to a drive circuit of each actuator. The control unit 100 determines the controlled variables (open/close state) of each control valve, a drive amount of the compressor 2 and so forth, based on predetermined external information that has been detected by various sensors, and then supplies the control current with which to drive each actuator. Here, the predetermined external information includes temperatures inside and outside the passenger compartment and the air-blowout temperature of the evaporator, for instance. Through the control performed by the control unit 100, the compressor 2 introduces the refrigerant, having a suction pressure Ps, via a suction chamber, and compresses this refrigerant so as to be discharged as the refrigerant having a discharge pressure Pd. In the present embodiment, a plurality of temperature sensors are installed to achieve the above control. Here, the plurality of temperature sensors are used to detect the temperatures at the outlet of the auxiliary condenser 3, one of ports of the external heat exchanger 5, the other of ports of the external heat exchanger 5, the inlet and the outlet of the evaporator 7, and so forth.

A description is now given of an operation of the refrigeration cycle in the present embodiment. FIGS. 2A and 2B are each a diagram for explaining an operation of the automotive air conditioner. FIG. 2A shows a state during a cooling operation. FIG. 2B shows a state during a heating operation. A Mollier diagram for explaining an operation of refrigeration cycle is shown in the upper part of each of FIGS. 2A and 2B. The horizontal axis of each Mollier diagram represents enthalpy, and the vertical axis thereof represents various pressures. An operating state of refrigeration cycle is shown below each of those Mollier diagrams. The bold lines and arrows in FIGS. 2A and 2B indicate the flow of refrigerant, and the letters "a" to "g" correspond respectively to those of the Mollier diagrams. Also, the dotted lines in FIGS. 2A and 2B indicate that the flow thereof is being shut off.

As shown in FIG. 2A, the first valve section is open and the second valve section is closed in each of the control valves 31, 32 and 33 during a cooling operation. At the same time, the first valve section is closed and the second valve section is open in the control valve 34. Thereby, the first refrigerant circulation passage and the third refrigerant circulation passage are opened, and the second refrigerant circulation passage is shut off. Thus, the high-temperature and high-pressure refrigerant discharged from the compressor 2 is condensed by passing through the external heat exchanger 5, on one hand, and is condensed by passing through the auxiliary condenser 3, on the other hand. At this time, the external heat exchanger 5 functions as an external condenser.

Then, the refrigerant having passed through the external heat exchanger 5 is throttled and expanded by the expansion valve 41 so as to become a misty, low-temperature and low-pressure refrigerant, and is led into the evaporator 7. Also, the refrigerant having passed through the auxiliary condenser 3 is throttled and expanded at the orifice 44 so as to become a misty, low-temperature and low-pressure refrigerant, and is led into the evaporator 7. Then this refrigerant evaporates in a process of passing through the evaporator 7 and thereby cools air inside the passenger compartment. The refrigerant led out from the evaporator 7 is returned to the compressor 2 by way of the second internal passage of the expansion valve 42. At this time, control is performed such that the superheat of refrigerant at an inlet side of the compressor 2 by the expansion valve 41 indicates an appropriate value. In the present embodiment, the expansion valve 41 autonomously regulates the valve opening degree such that a refrigerant state at the inlet side of the compressor 2 during a cooling operation is in a superheat range of 5° C. to 10° C.

As shown in FIG. 2B, on the other hand, the first valve section is closed and the second valve section is open in each of the control valves 31, 32 and 33 during a normal heating operation. At the same time, the first valve section is open and the second valve section is closed in the control valve 34. Thereby, the first refrigerant circulation passage and the third refrigerant circulation passage are shut off, and the second refrigerant circulation passage is opened. Thereby, no refrigerant passes through the evaporator 7 and therefore the evaporator 7 practically does not function as such. In other words, the external heat exchanger 5 only functions as an evaporator (external evaporator). That is, the refrigerant discharged from the compressor 2 circulates through the second refrigerant circulation passage in such a manner as to pass through the auxiliary condenser 3, the expansion valve 42 and the external heat exchanger 5 so as to return to the compressor 2.

In other words, a high-temperature and high-pressure gaseous refrigerant discharged from the compressor 2 is condensed by passing through the auxiliary condenser 3 and is then adiabatically expanded at the expansion valve 42 so as to become a low-temperature and low-pressure gas-liquid two-phase refrigerant. And this two-phase refrigerant is evaporated by passing through the external heat exchanger 5. This pumps up heat from the exterior. The refrigerant, which has passed through the external heat exchanger 5, now passes through the second internal passage of the expansion valve 42 and then returns to the compressor 2. The air led into the passenger compartment is heated up in a process where the air passes through the auxiliary condenser 3. At this time, control is performed such that the superheat at the inlet side of the compressor 2 by the expansion valve 42 indicates an appropriate value. In the present embodiment, the expansion valve 42 autonomously regulates the valve opening degree such that the refrigerant state at the inlet side of the compressor 2 during a heating operation is in a range where the dryness is greater than or equal to 0.9 and the superheat is less than or equal to 5° C. Note that, during a heating-dehumidification operation, the first refrigerant circulation passage is shut off while the second refrigerant circulation passage and the third refrigerant circulation passage are opened. Also, the flow rates of refrigerant flowing through the second refrigerant circulation passage and the third refrigerant circulation passage are each regulated by the control valve 34. Thereby, the air in the passenger compartment is not only heated up but also dehumidified.

Figure 3:
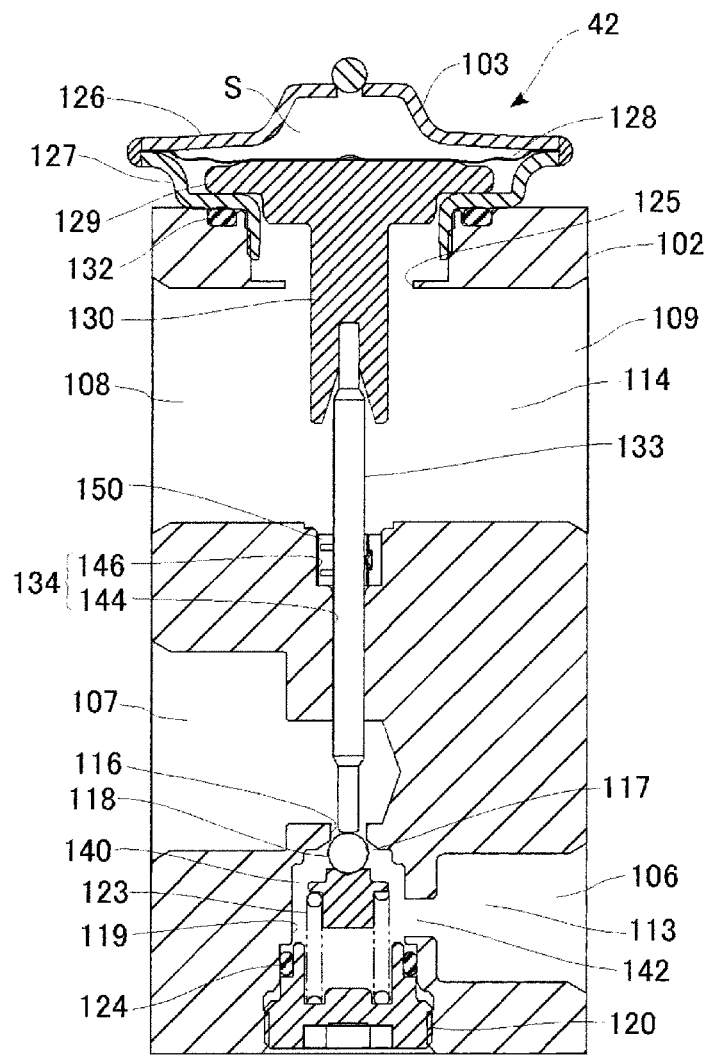
FIG. 3 is a cross-sectional view showing a structure of an expansion valve.

A description is now given of a concrete structure of an expansion valve according to the present embodiment. FIG. 3 is a cross-sectional view showing a structure of the expansion valve 42. The expansion valve 42 has a body 102 formed such that a member, which has been formed such that a raw material made of an aluminum alloy undergoes extrusion molding, is subjected to a predetermined cutting work. This body 102, which is prismatic in shape, is provided with a valve section that throttles and expands the refrigerant. A power element 103, which functions as a temperature-sensing section, is provided at a longitudinal end of the body 102.

The body 102 has sides formed with a lead-in port 106, a lead-out port 107, a lead-in port 108, and a lead-out port 109. The lead-in port 106 receives a high-temperature and high-pressure liquid refrigerant from an auxiliary condenser 3 side. The lead-out port 107 supplies a low-temperature and low-pressure refrigerant, which is throttled and expanded by the expansion valve 42, to the external heat exchanger 5 (external evaporator). The lead-in port 108 receives the refrigerant evaporated by the external heat exchanger 5. The lead-out port 109 returns the refrigerant, which has passed through the expansion valve 42, to the compressor 2.

In the expansion valve 42, a first internal passage 113 is configured by the lead-in port 106, the lead-out port 107, and a passage joining the port 106 to the port 107. A valve section is provided in a middle part of the first internal passage 113. The refrigerant introduced through the lead-in port 106 is throttled and expanded through this valve section and then turned into a spray so as to be supplied to the external heat exchanger 5 through the lead-out port 107. Also, a second internal passage 114, which corresponds to "return passage", is configured by the lead-in port 108, the lead-out port 109, and a passage joining the port 108 and the port 109. The second internal passage 114 extends straight, and the refrigerant, which has been led in through the lead-in port 108, is delivered to the compressor 2 through the lead-out port 109.

In other words, a valve hole 116 is provided in a middle part of the first internal passage 113 in the body 102, and a valve seat 117 is formed by an opening end edge on an lead-in port 106 side of the valve hole 116. A valve element 118 is so placed as to face the valve seat 117 from a lead-in port 106 side. The valve element 118 is constructed such that a spherical ball valve element, which closes and opens the valve section by touching and leaving the valve seat 117, respectively, is joined to a valve element support that supports the ball valve element from below.

In a lower end part of the body 102, a communication hole 119, which communicates the inside and the outside of the body 102, is formed in a direction orthogonal to the first internal passage 113, and a valve chamber 140, which houses the valve element 118, is formed by an upper half of the communication hole 119. The valve chamber 140 communicates to the valve hole 116 at an upper end of the valve chamber 140, whereas the valve chamber 140 communicates to the lead-in port 106 on a lateral side of the valve chamber 140 through a small hole 142 and constitutes a part of the first internal passage 113. The small hole 142 is formed such that the cross section of part of the first internal passage 113 is locally narrowed down, and the small hole 142 is open into the valve chamber 140.

In a lower half of the communication hole 119, an adjustment screw 120 (which corresponds to "adjustment member") is screwed in such a manner as to seal the communication hole 119 from the outside. A spring 123, which biases the valve element 118 in a valve closing direction, is set between the valve element 118 (more precisely, the valve element support and the adjustment screw 120. The spring load of the spring 123 can be adjusted by a screwing amount of the adjustment screw 120 into the body 102. An O-ring 124 used to prevent the leakage of refrigerant is set between the adjustment screw 120 and the body 102.

In an upper end part of the body 102, a communication hole 125, which communicates to and from the body 102, is formed in a direction orthogonal to the second internal passage 114, and the power element 103 (which corresponds to "temperature-sensing section") is screwed in such a manner as to seal the communication hole 125. The power element 103 is configured such that a diaphragm 128 formed of a sheet metal is held between an upper housing 126 and a lower housing 127 and such that a disk 129 is disposed on a lower housing 127 side. A hermetically sealed space, which is enclosed by the upper housing 126 and the diaphragm 128, forms a gas chamber S in which a gas used to sense the temperature is filled and sealed. In the present embodiment, the same gas as the refrigerant circulating in the refrigeration cycle or a gas having an equivalent tendency in the saturated liquid property is sealed in the gas chamber S as a temperature-sensing gas. The disk 129 has an extending section 130 that extends downward from a central part of a disk-shaped body of the disk 129. An O-ring 132 by which to prevent the leakage of refrigerant is set between the power element 103 and the body 102.

The pressure and temperature of refrigerant passing through the second internal passage 114 are transmitted to an underside of the diaphragm 128 by way of the communication hole 125 and grooves provided in the disk 129. In the present embodiment, a thermal filler, such as an aluminum alloy having a high thermal conductivity, is used as a material used for the disk 129, and the disk 129 is configured such that it extends into the second internal passage 114. This structure allows the temperature of refrigerant flowing through the second internal passage 114 to be easily transmitted to the underside of the diaphragm 128 through the medium of the disk 129. This structure also contributes to reducing a time constant used to sense the temperature by the expansion valve 42 at an outlet side of the external heat exchanger 5. In other words, the structure of the disk 129 functions as a "temperature-sensing accelerating structure".

A stepped hole 134, which connects the first internal passage 113 to the second internal passage 114, is provided in a central part of the body 102. And an elongated shaft 133 (which functions as an "actuating rod") is slidably inserted into a smaller-diameter part 144 of the stepped hole 134. The shaft 133 is set between the disk 129 and the valve element 118. The shaft 133 connects to the extending section 130 of the disk 129 such that an upper end of the shaft 133 is fitted to the underside of the extending section 130 thereof and such that a lower end thereof comes in contact with the valve element 118. With this arrangement and the structures, a drive force generated by a displacement of the diaphragm 128 is transmitted to the valve element 118 through the medium of the disk 129 and the shaft 133 so as to open or close the valve section.

An upper half of the shaft 133 extends out to the second internal passage 114, whereas a lower half thereof slidably penetrates the smaller-diameter part 144 of the stepped hole 134. A vibration-proof spring 150, by which to exert a biasing force in a direction vertical to the direction of axis line on the shaft 133, namely by which to exert a lateral load (sliding load) on the shaft 133, is placed in a larger-diameter part 146 of the stepped hole 134 (the larger-diameter part 146 corresponding to "hole section"). As the shaft 133 receives the lateral load of the vibration-proof spring 150, the vibration of the shaft 133 and the valve element 118 produced by a displacement developed by the refrigerant pressure is suppressed or inhibited. As for a concrete structure of the vibration-proof spring 150, a structure described in Japanese Patent Application No. 2013-32425 (unpublished patent application file), for instance, may be used and therefore its detail thereof is omitted here.

In the expansion valve 42 as configured above, the power element 103 senses the pressure and the temperature of the refrigerant that has been brought back from the external heat exchanger 5 via the lead-in port 108 and thereby the diaphragm 128 develops a displacement. The displacement developed by the diaphragm 128 becomes the drive force and is then transmitted to the valve element 118 through the medium of the disk 129 and the shaft 133, thereby opening and closing the valve section. Also, the liquid refrigerant supplied from the auxiliary condenser 3 is introduced through the lead-in port 106 and then passes through the valve section. Having thus passing through the valve section throttles and expands the liquid refrigerant, thereby turned it into a low-temperature and low-pressure misty refrigerant. This misty refrigerant is delivered toward the external heat exchanger 5 through the lead-out port 107.

Figure 4:
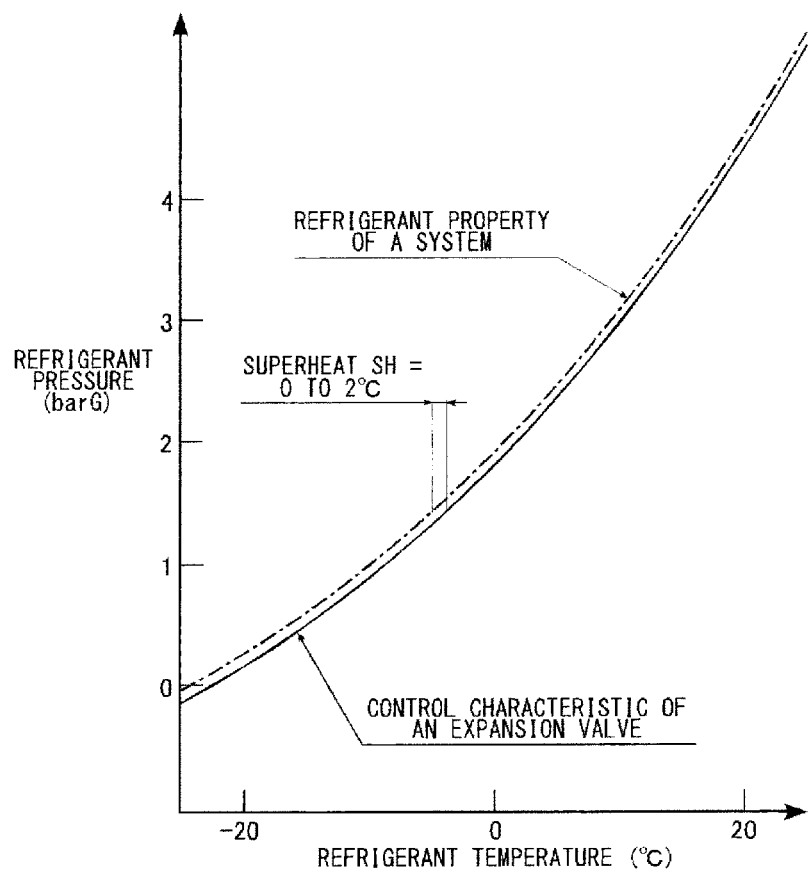
FIG. 4 is a graph showing saturated liquid properties of gas sealed in an expansion valve.
Figure 5:
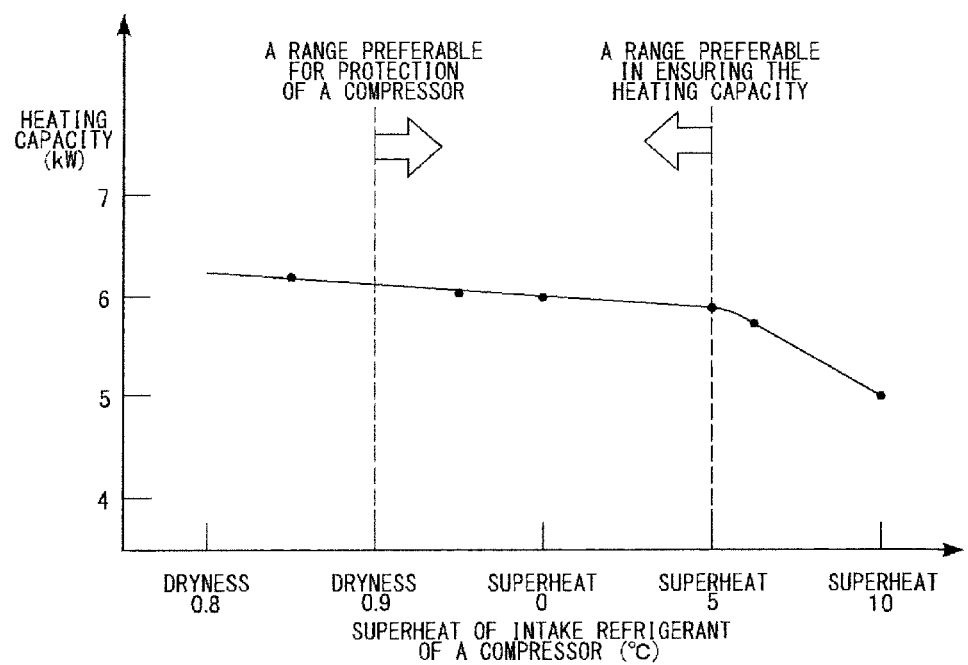
FIG. 5 is a graph showing a relation between a superheat of intake refrigerant of a compressor and a heating capacity.

FIG. 4 is a graph showing saturated liquid properties of gas sealed in the expansion valve 42. The horizontal axis of FIG. 4 indicates the temperature of refrigerant, and the vertical axis thereof indicates the pressure of refrigerant. The solid line of FIG. 4 represents the control characteristic of the expansion valve 42, and a dot-dash line thereof represents the characteristic of refrigerant flowing in the refrigeration cycle. FIG. 5 is a graph showing a relation between a superheat of intake refrigerant of the compressor 2 and the heating capacity. The horizontal axis of FIG. 5 indicates the dryness and the superheat of intake refrigerant near an inlet of the compressor 2, and the vertical axis thereof indicates the heating capacity.

As shown in FIG. 4, in the present embodiment, a thermostatic expansion valve employing the normal charge method (or parallel charge method) is used as the expansion valve 42. Thus, the flow rate of refrigerant supplied to the external heat exchanger 5 is controlled such that the refrigerant temperature at the outlet of the external heat exchanger 5 during a heating operation is constantly higher than a saturated vapor pressure curve. In other words, the flow rate thereof is controlled such that the refrigerant temperature thereat has a superheat SH. In the present embodiment, the spring load of the spring 123 is adjusted such that the range of superheat SH regulated by the expansion valve 42 (the range of superheat sensed by the power element 103) lies within 0° C. to 2° C. (both inclusive) as designed in the first place and as illustrated by FIG. 4.

Thereby, as shown in FIG. 5, control is performed such that the refrigerant state (intake refrigerant state) at the inlet side of the compressor 2 is in a range where the dryness is greater than or equal to 0.9 and the superheat is less than or equal to 5° C. In other words, the valve opening degree characteristic of the expansion valve 42 is set such that the expansion valve 42 autonomously regulates such that the refrigerant state at the inlet side of the compressor 2 is in a range where the dryness is greater than or equal to 0.9 and the superheat is less than or equal to 5° C. As evident from FIG. 5, during a heating operation, the falling rate of the heating capacity is larger when the superheat of intake refrigerant exceeds 5° C. When, on the other hand, the dryness falls below 0.9, the operation of the compressor 2 may possibly be hindered by the so-called liquid back-flow. In the light of this situation, in the present embodiment, the valve opening degree characteristic of the expansion valve 42 is determined to be set such that the refrigerant state (intake refrigerant state) at the inlet side of the compressor 2 is in a range where the dryness is greater than or equal to 0.9 and the superheat is less than or equal to 5° C.

By employing the present embodiment, the heating capacity can be maintained at a high level while the liquid back-flow problem is resolved or alleviated. The reason why the range between the dryness of 0.9 and the superheat of 0° C. is permitted is as follows. Very small amount of liquid-phase refrigerant contained in the intake refrigerant of the compressor 2 does not affect the operation of the compressor 2. Furthermore, it is rather preferable in that a required amount of lubricating oil can be returned to the compressor 2. The inclusion relation between the setting values of the expansion valve 42 (the superheat ranging between 0° C. and 2° C.) and the setting values of intake refrigerant of the compressor 2 (the range between the dryness of 0.9 and the superheat of 5° C.) means that once the expansion valve 42 is set, the setting value of intake refrigerant of the compressor 2 will be preferably set. More preferably, the refrigerant state at the inlet side of the compressor 2 is a superheat of 0° C. Also, according to the present embodiment, the above-described temperature-sensing accelerating structure of the disk 129 allows the state of intake refrigerant to be quickly brought close to a target value and allows it to be stably kept close to the target value.

The expansion valve 41 has a structure similar to that of the expansion valve 42 except that the setting values of superheat differs from those for the expansion valve 42. Thus the detailed description thereof is omitted here. In other words, the filler gas pressure of pressure-sensing gas in the expansion valve 41 differs from that in the expansion valve 42. In the present embodiment, the valve opening degree characteristic of the expansion valve 41 is set such that the expansion valve 41 autonomously regulates such that the refrigerant state at the inlet side of the compressor 2 during a cooling operation is in a superheat range of 5° C. to 10° C.

(First Modification)

Figure 6:
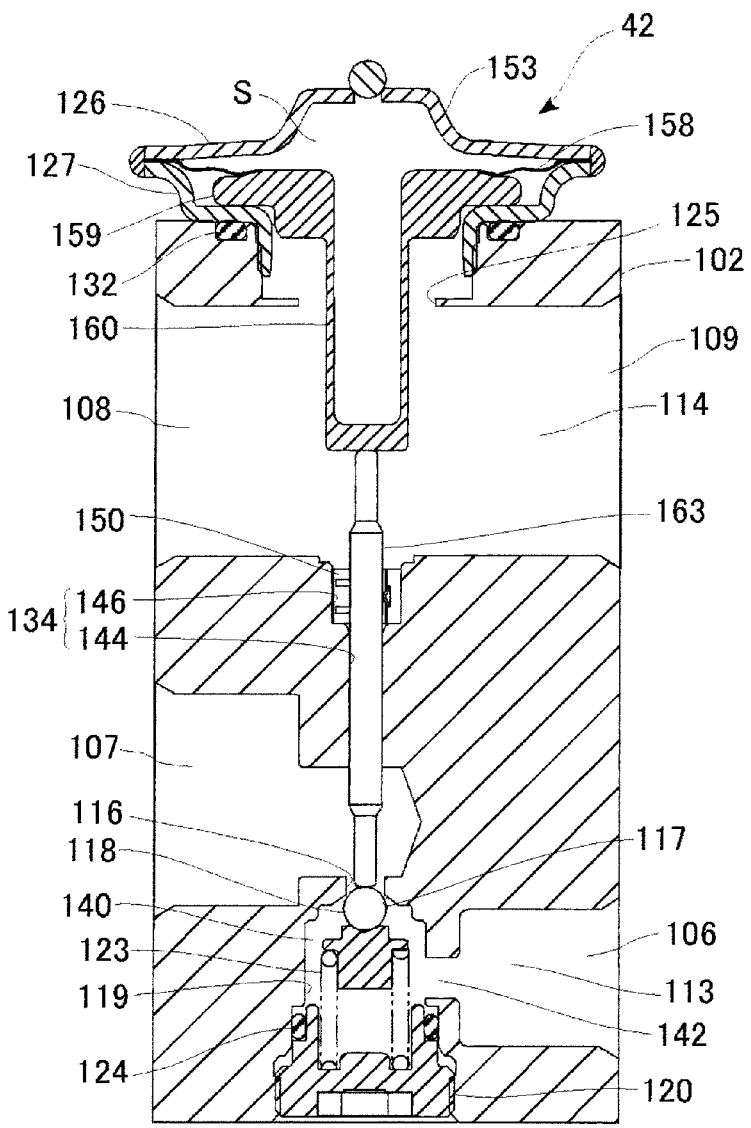
FIG. 6 is a cross-sectional view showing a structure of an expansion valve according to a modification.

FIG. 6 is a cross-sectional view showing a structure of an expansion valve 42 according to a first modification of the first embodiment. The same components of FIG. 6 as those of the above-described embodiment (FIG. 3) are given the same reference numerals as those of FIG. 3.

In the first modification, a disk 159, which is a bottomed and stepped cylindrical shape, has an internal space formed inside an extending section 160 of the disk 159. Also, a diaphragm 158 is constructed in a ring shape, and the inner periphery of the diaphragm 158 is joined to a top face of the disk 159. A hermetically sealed space, which is enclosed by the upper housing 126, the diaphragm 158 and the disk 159, forms a gas chamber S. In other words, the first modification differs from the above-described embodiment in that the gas chamber S extends down to a position of the second internal passage 114. A shaft 163 is slightly shorter than the shaft 133 of the above-described embodiment, and an upper end surface of the shaft 163 abuts against a lower end surface of the disk 159. With this arrangement and the structures, the temperature of refrigerant flowing through the second internal passage 114 is quickly transmitted to the gas chamber S and therefore the sensitivity of a power element 153 is improved. That is, the structure that forms such the gas chamber S functions as the "temperature-sensing accelerating structure". It goes without saying that the first modification is applicable to the expansion valve 41 as well.

(Second Modification)

Figure 7:
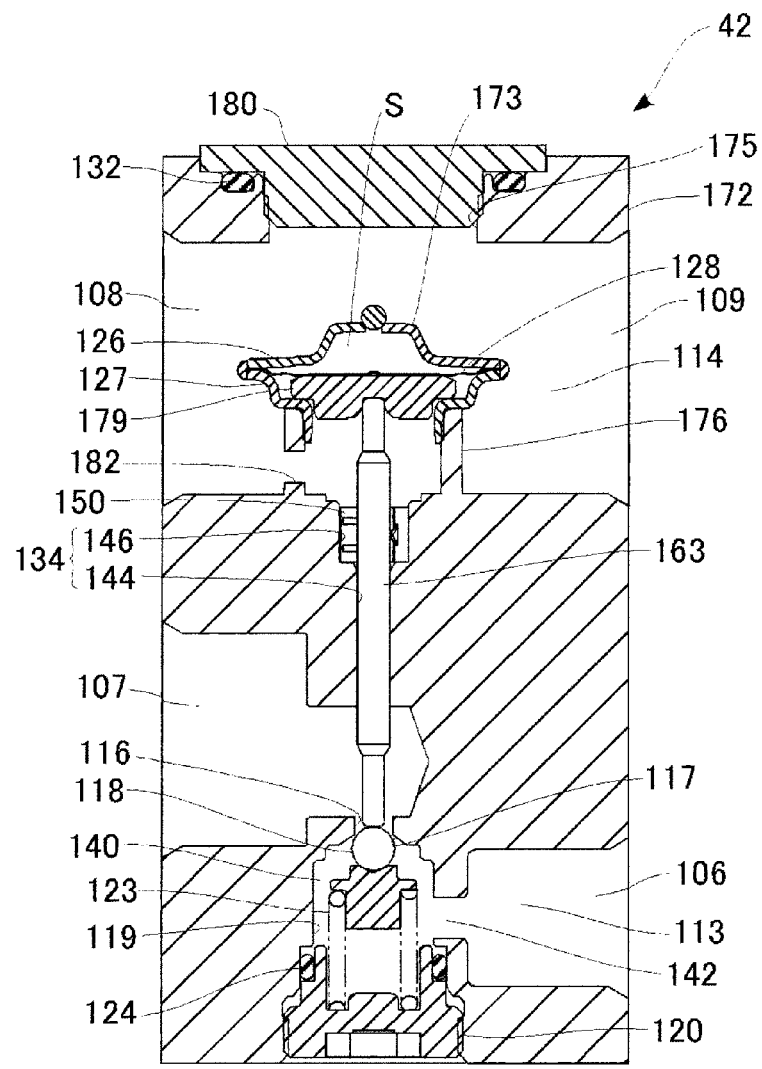
FIG. 7 is a cross-sectional view showing a structure of an expansion valve according to another modification.

FIG. 7 is a cross-sectional view showing a structure of an expansion valve 42 according to a second modification thereof. The same components of FIG. 7 as those of the above-described embodiment (FIG. 3) are given the same reference numerals as those of FIG. 3.

In the second modification, a power element 173 in its entirety is placed in the second internal passage 114. An upper-end opening of a body 172 is closed by a lid member 180. A shaft 163 is installed between a disk 179 of the power element 173 and the valve element 118. A partition wall 176 having a circular boss shape is provided in the body 172. The partition wall 176 extends toward the inside of the second internal passage 114 from a divider wall provided between the first internal passage 113 and the second internal passage 114. The power element 173 is so mounted as to seal off an upper-end opening of the partition wall 176.

A communication hole 182, which communicates the inside and the outside, is formed in the partition wall 176. Thus, a part of refrigerant flowing through the second internal passage 114 is led into a space inside the partition wall 176 through the communication hole 182 and is then led to the underside of the diaphragm 128. By employing the second modification, the temperature of refrigerant flowing through the second internal passage 114 is quickly transmitted to the gas chamber S and therefore the sensitivity of the power element 173 is improved. That is, the above-described structure where the power element 173 is arranged in the second internal passage 114 functions as the "temperature-sensing accelerating structure". It goes without saying that the second modification is applicable to the expansion valve 41 as well.

Various other modifications may be conceivable for the "temperature-sensing accelerating structure". For example, a temperature-sensing capillary tube may be mounted near the inlet of the compressor 2, so that the temperature can be transmitted to the gas chamber S. The length of a piping between the expansion valve 42 and the compressor 2 may be made to be extremely short so that the temperature near the inlet of the compressor 2 can be sensed.

Second Embodiment

Figure 8:
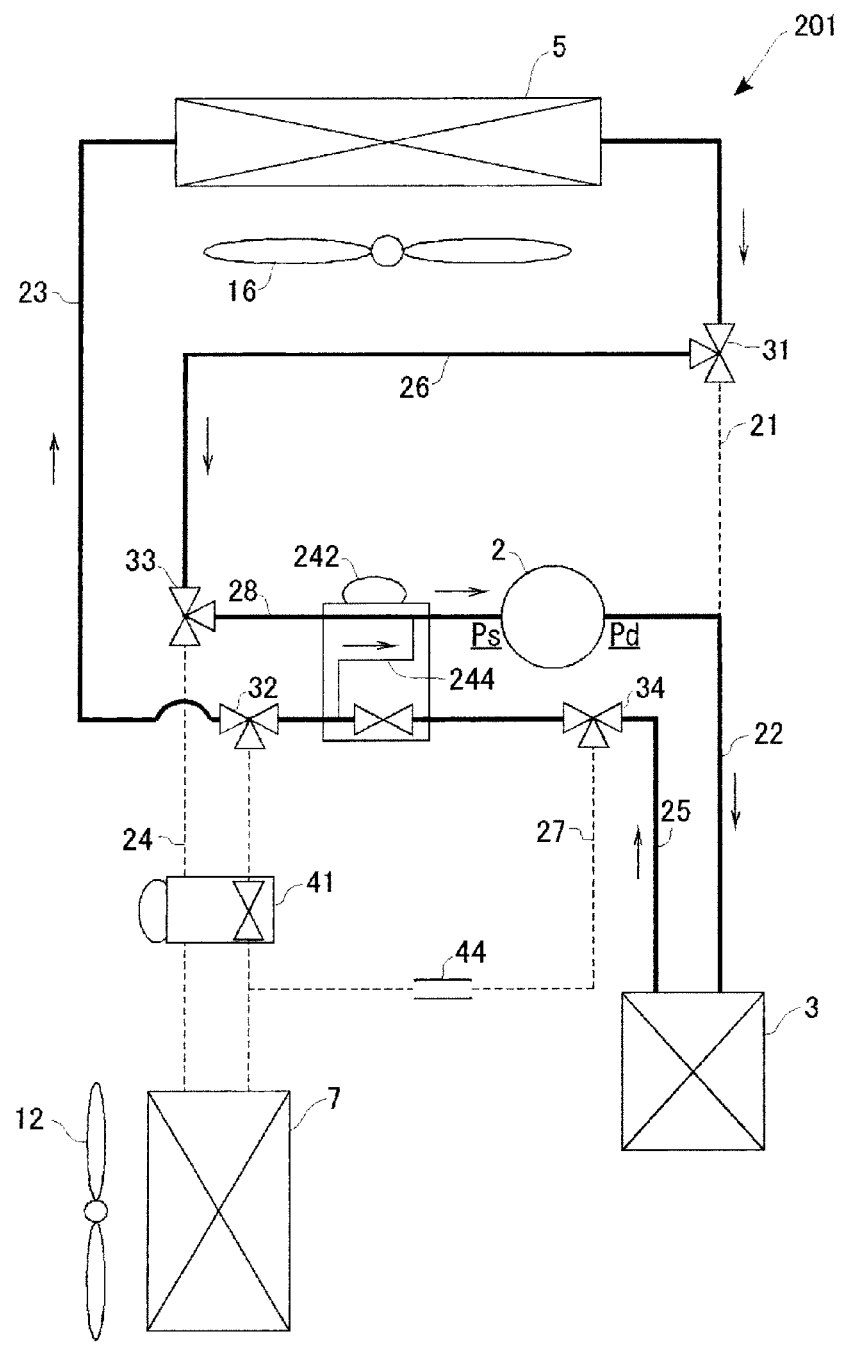
FIG. 8 illustrates a system structure of an automotive air conditioner according to a second embodiment.
Figure 9:
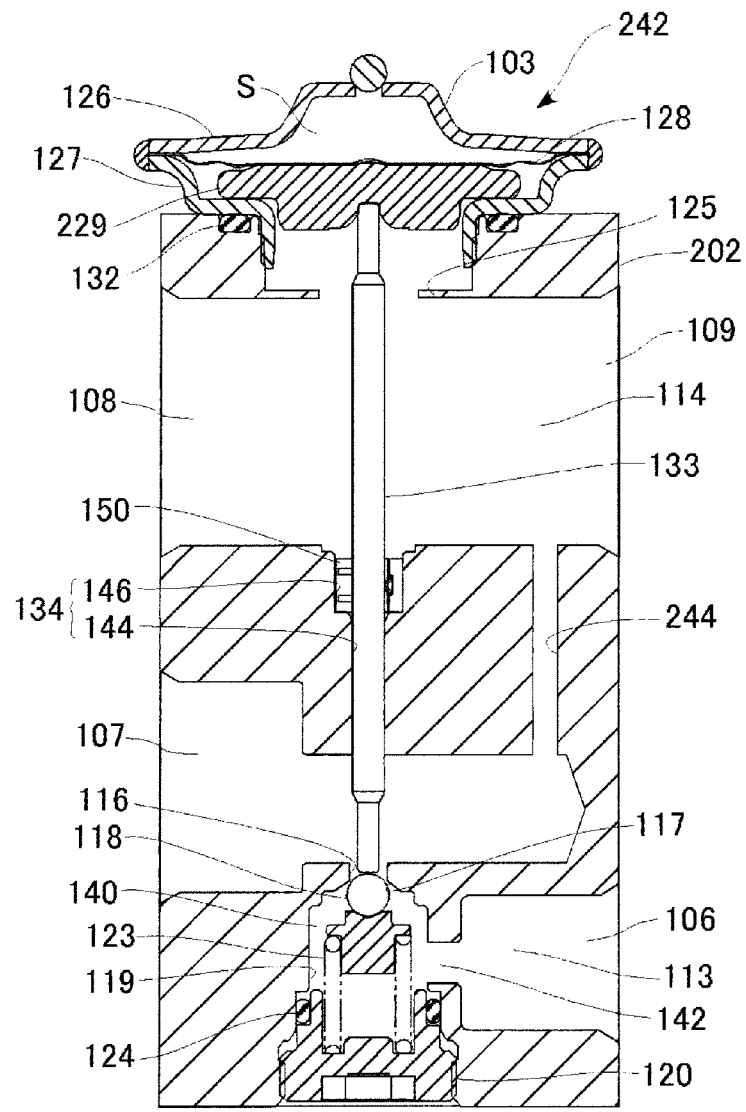
FIG. 9 is a cross-sectional view showing a structure of an expansion valve according to a second embodiment.

A description is now given of a second embodiment of the present invention. An automotive air conditioner according to the second embodiment has a structure similar to that of the air conditioner according to the first embodiment except that the structure of a second expansion valve differs from that of the first embodiment. Thus, the structural components of the second embodiment similar to those of the first embodiment are given the identical reference numerals and the repeated description thereof is omitted as approximate. FIG. 8 illustrates a system structure of an automotive air conditioner according to the second embodiment. FIG. 9 is a cross-sectional view showing a structure of an expansion valve according to the second embodiment.

As shown in FIG. 8, an automotive air conditioner 201 is provided with an expansion valve 242 in the second refrigerant circulation passage, in place of the expansion valve 42 of the first embodiment. A bypass passage 244 that communicates the fifth passage 25 to the common 28 is provided in the fifth passage 25.

In other words, as shown in FIG. 9, the bypass passage 244, which communicates between the first internal passage 113 and the second internal passage 114, is formed in a body 202 of the expansion valve 242. The bypass passage 244 has an inlet, which is positioned at a downstream side of a valve section in the first internal passage 113, and an outlet, which is positioned at a downstream side of the power element 103 (temperature-sensing section) in the second internal passage 114. The bypass passage 244 is configured as a fixed orifice whose cross-sectional area is smaller than that of the valve hole 116. And a large proportion of refrigerant flowing through the first internal passage 113 is led from the lead-out port 107 toward the external heat exchanger 5. Note that a disk 229 of the second embodiment does not have the extending section of the first embodiment.

With this arrangement and the structures, the refrigerant led through the lead-in port 108 can be cooled by the refrigerant bypassed through the bypass passage 244. That is, the arrangement is such that part of refrigerant, which has been throttled and expanded by the valve section so as to become low in temperature, is led into the second internal passage 114 and thereby the superheat of refrigerant having passed through the external heat exchanger 5 can be reduced. In the present embodiment, the superheat is controlled by the expansion valve 242, and the superheat is reduced by the refrigerant bypassed. Thereby, the refrigerant state at the inlet side of the compressor 2 is set to be brought close to a superheat of 0° C. In other words, the structure where a low-temperature refrigerant is bypassed by the bypass passage 244 functions as a "superheat regulating structure" used to assist in enabling the refrigerant state at the inlet side of the compressor 2 to be brought close to a superheat of 0° C. Note that the outlet of the bypass passage 244 is positioned at a downstream side of the power element 103. Thus, the introduction of refrigerant via the bypass passage 244 does not cause hunting in the control of superheat by the expansion valve 242.

(First Modification)

FIGS. 10A and 10B each illustrates a system structure of an automotive air conditioner according to a first modification of the second embodiment. The same components of each of FIGS. 10A and 10B as those of the second embodiment (FIG. 8) are given the same reference numerals as those of FIG. 8.

In the first modification, as shown in FIG. 10A, a superheat control valve 246 is provided in the bypass passage 244. The superheat control valve 246 is enabled upon sensing a superheat of refrigerant at an outlet side of the bypass passage 244 (an outlet side of the external heat exchanger 5) and adjusts the valve opening degree such that the superheat is brought close to a preset value (preset superheat). That is, control is performed in cooperation between the expansion valve 242 and the superheat control valve 246 such that the refrigerant state at the inlet side of the compressor 2 is brought close to a superheat of 0° C.

Or alternatively, as shown in FIG. 10B, the bypass passage 244 may be provided outside the second expansion valve as a piping. In this modification, the expansion valve 42 of the first embodiment is used as the second expansion valve. The bypass passage 244 connects a downstream-side position of the expansion valve 42 in the fifth passage 25 and a downstream-side position thereof in the common passage 28. The superheat control valve 246 is provided in the bypass passage 244. Where this alternative structure is used, the outlet of the bypass passage 244 is preferably provided near the inlet of the compressor 2 so that the superheat of refrigerant at the inlet side of the compressor 2 can be directly controlled. The superheat control valve 246 performs control such that the refrigerant state at the inlet side of the compressor 2 is brought close to a superheat of 0° C.

A differential pressure regulating valve may be provided in place of the superheat control valve 246. This differential pressure regulating valve opens a valve and opens the bypass passage 244 when the differential pressure between two points (see below) is greater than or equal to a preset differential pressure. Here, one of the two points is a predetermined position of the fifth passage 25 (a downstream-side position of a valve section of the expansion valve 42 or 242), and the other thereof is a predetermined position of the common passage 28 (a downstream-side position of a temperature-sensing section of the expansion valve 42 or 242). As the superheat of refrigerant at the outlet side of the external heat exchanger 5 becomes large, the differential pressure between the two points tends to be larger. Thus, in a required state only, the differential pressure regulating valve is opened to thereby allow a low-temperature refrigerant to bypass with the result that an increase of superheat is suppressed.

(Second Modification)

FIGS. 11A and 11B each illustrates a system structure of an automotive air conditioner according to a second modification thereof. The same components of each of FIGS. 11A and 11B as those of the second embodiment (FIG. 8) are given the same reference numerals as those of FIG. 8.

In the second modification, as shown in FIG. 11A, the inlet of the bypass passage 244 is provided in an upstream-side position of a valve section in an expansion valve 342. The superheat control valve 246 is provided in the bypass passage 244. With this arrangement and the structures, a part of high-temperature and high-pressure refrigerant is introduced at a downstream-side of a temperature-sensing section in the expansion valve 342; this feature differs from the second embodiment. The superheat control valve 246 is enabled upon sensing a superheat of refrigerant at the outlet side of the bypass passage 244 (the outlet side of the external heat exchanger 5) and adjusts the valve opening degree such that the superheat is brought close to a preset value (preset superheat). That is, control is performed in cooperation between the expansion valve 342 and the superheat control valve 246 such that the refrigerant state at the inlet side of the compressor 2 is brought close to a superheat of 0° C.

Or alternatively, as shown in FIG. 11B, the bypass passage 244 may be provided outside the second expansion valve as a piping. In this modification, the expansion valve 42 of the first embodiment is used as the second expansion valve. The bypass passage 244 connects a upstream-side position of the expansion valve 42 in the fifth passage 25 and a downstream-side position thereof in the common passage 28. The superheat control valve 246 is provided in the bypass passage 244. Where this alternative structure is used, the outlet of the bypass passage 244 is preferably provided near the inlet of the compressor 2 so that the superheat of refrigerant at the inlet side of the compressor 2 can be directly controlled. The superheat control valve 246 performs control such that the refrigerant state at the inlet side of the compressor 2 is brought close to a superheat of 0° C.

The description of the present invention given above is based upon illustrative embodiments. These embodiments are intended to be illustrative only and it will be obvious to those skilled in the art that various modifications could be further developed within the technical idea underlying the present invention and that such additional modifications are also within the scope of the present invention.

Though not mentioned in the second embodiment and its modifications, the flow of refrigerant by way of the bypass passage 244 may be accelerated to a certain degree by providing a differential pressure generating structure located downstream of a branched-off passage of the fifth passage 25 into the bypass passage 244. For example, a throttle passage member, which gives flow resistance (pressure loss) to the refrigerant flowing at a lead-out port 107 side, may be provided in the first internal passage 113 of the expansion valve 242. For the "throttle passage member", one cited in Japanese Unexamined Patent Application Publication (Kokai) No. 2011-245549 (the throttle passage member 1), for instance, may be used. Such a throttle passage member is provided in a position, closer to the lead-out port 107 than the valve hole 116, in the first internal passage 113 (in a position opposite to the bypass passage 244 relative to the valve hole 116). As a result, the differential pressure (pressure loss) is generated and the flow of refrigerant toward the bypass passage 244 located opposite thereto can be accelerated.

In the above-described embodiments, a description has been given of an example of a mechanical control valve, as an expansion valve, which senses the temperature and the pressure of refrigerant and operates autonomously. Instead, an electronic control valve, which operates using a solenoid, a motor or the like as an actuator, may be used. For example, an electronic expansion valve of stepping motor driven type may be used and the opening degree thereof may be controlled by the control unit. In such a case, there may be provided a sensor that senses the temperature thereof at the inlet side of the compressor 2 or the temperature thereof at the outlet side of the external heat exchanger 5. The control unit may control the valve opening degree of the electronic expansion valve, based on the value detected by the sensor, as follows. That is, the control unit may control it such that the refrigerant state at the inlet side of the compressor 2 is in a range where the dryness is greater than or equal to 0.9 and the superheat is less than or equal to 5° C. (more preferably, the refrigerant state thereat is brought close to a superheat of 0° C.). The electronic expansion valve may be a proportional valve or an open/close valve (on/off valve). In the latter case, a duty ratio for open/close of a valve section may be set.

In each of the modifications (FIGS. 10A and 10B and FIGS. 11A and 11B) of the above-described second embodiment, a description has been given of an example of a mechanical control valve, as the superheat control valve 246, which senses the superheat of refrigerant and operates autonomously. Instead, an electronic superheat valve, which operates using a solenoid, a motor or the like as an actuator, may be used. The control unit may control the valve opening degree of the superheat valve, based on the value detected by the sensor, such that the refrigerant state at the inlet side of the compressor 2 is in a range where the dryness is greater than or equal to 0.9 and the superheat is less than or equal to 5° C. (more preferably, the refrigerant state thereat is brought close to a superheat of 0° C.). The superheat valve may be a proportional valve or an open/close valve (on/off valve).

In each of the above-described embodiments, a description has been given of an exemplary structure where a single compressor is provided in an automotive air condition of the present invention. In a modification, a system where a plurality of compressors are provided, for example, may be employed. For example, the refrigerant is compressed in two stages in the system, and the structures employed in the above-embodiments and their modifications may be applied to the second (subsequent) stage (second compressor) of the two compressors.

Though not mentioned in the above-described embodiments, an expansion valve with an electromagnetic valve where a solenoid, used to change the setting of valve opening characteristic from the exterior, is assembled may be used in the mechanical valve mechanism whereby the opening degree of a valve section is autonomously regulated by driving the power element. For example, the structure cited in Japanese Unexamined Patent Application Publication (Kokai) No. 2004-116834 may be used. With this arrangement and the structures according to this modification, the solenoid is driven, as appropriately, in response to the superheat of refrigerant at the inlet side of the compressor 2, so that the responsiveness in the superheat control can be improved.

Though not mentioned in the above-described embodiments, a first bypass passage and a second bypass passage may be formed. Here, the first bypass passage bypasses a route between an upstream-side position of a valve section of the expansion valve 42 and a downstream-side position of a temperature-sensing section thereof, whereas the second bypass passage bypasses a route between a downstream-side position of the valve section of the expansion valve 42 and the downstream-side position of the temperature-sensing section thereof. Also, a first superheat control valve capable of regulating the opening degree of the first bypass passage and a second superheat control valve capable of regulating the opening degree of the second bypass passage may be provided, and the first superheat control valve and the second superheat control valve may be linked with each other. Thereby, the superheat thereof at the inlet side of the compressor 2 is controlled. The first and second superheat control valves may be configured as a composite valve, which is driven to open and close, by linkage with a single power element. For example, the structure cited in Japanese Unexamined Patent Application Publication (Kokai) No. 2012-220142 may be used whereby the first valve cited therein is used as the first superheat control valve and the second valve cited therein as the second superheat control valve.

In each of the above-described embodiments, a description has been given of an example where the automotive air conditioner of the present invention is applied to an electric-powered vehicle. It goes without saying, however, that the automotive air conditioner of the present embodiments and their modifications is also applicable to an automobile provided with an internal-combustion engine and a hybrid automobile equipped with both an internal-combustion engine and an electric motor. Although in each of the above-described embodiments a description has been given of an example where a motor compressor is used as the compressor 2, a variable displacement compressor capable of controlling the refrigerant discharging capacity by use of the rotation of the engine may also be used.

What is claimed is:

1. An automotive air conditioner comprising:
    a compressor configured to compress refrigerant and discharge the compressed refrigerant;
    an external heat exchanger configured to function as an external condenser that radiates heat off the refrigerant during a cooling operation and configured to function as an external evaporator that evaporates the refrigerant during a heating operation;
    an internal evaporator configured to evaporate the refrigerant;
    an auxiliary condenser configured to radiate heat off the refrigerant separately from the external heat exchanger;
    a first refrigerant circulation passage through which, during the cooling operation, the refrigerant discharged from the compressor is able to circulate by passing sequentially through the external condenser and the internal evaporator and returning to the compressor;
    a second refrigerant circulation passage through which, during the heating operation, the refrigerant discharged from the compressor is able to circulate by passing sequentially through the auxiliary condenser and the external evaporator and returning to the compressor;
    a first expansion valve, provided in the first refrigerant circulation passage, configured to throttle and expand the refrigerant introduced from the external condenser and configured to be able to deliver the throttled and expanded refrigerant to the internal evaporator; and
    a second expansion valve, provided in the second refrigerant circulation passage, configured to throttle and expand the refrigerant introduced from the auxiliary condenser and configured to be able to deliver the throttled and expanded refrigerant to the external evaporator,
    wherein the second expansion valve regulates a valve opening degree such that a refrigerant state at an inlet side of the compressor during the heating operation is in a range where dryness is greater than or equal to 0.9 and superheat is less than or equal to 5° C.

2. An automotive air conditioner according to claim 1, wherein the second expansion valve senses temperature and pressure of the refrigerant flowing from the external evaporator to the compressor so as to operate autonomously, and
    the second expansion valve is a thermostatic expansion valve employing a normal charge method, the normal charge method being a method in which a temperature of the refrigerant at an outlet of the external heat exchanger during the heating operation is higher than a saturated vapor pressure curve of the refrigerant used in a refrigeration cycle.

3. An automotive air conditioner according to claim 2, wherein the second expansion valve operate autonomously such that a range of superheat sensed by a temperature-sensing section of the second expansion valve lies within 0° C. to 2° C. (both inclusive).

4. An automotive air conditioner according to claim 3, further comprising a superheat regulating structure configured to assist in enabling the refrigerant state at the inlet side of the compressor to be brought close to a superheat of 0° C.,
    the superheat regulating structure including a bypass passage that connects a first passage to a second passage, wherein the first passage connects the auxiliary condenser to the external evaporator, and the second passage connects the external evaporator to the compressor,
    wherein the bypass passage is so provided as to connect a position downstream of a valve section of the second expansion valve in the first passage to a position downstream of the temperature-sensing section of the second expansion valve in the second passage, and
    wherein an orifice used to restrict a flow of the refrigerant is provided in the bypass passage.

5. An automotive air conditioner according to claim 4, further comprising a differential pressure generating structure used to generate a differential pressure, the differential pressure generating structure being provided downstream of a branched-off passage of the first passage into the bypass passage.

6. An automotive air conditioner according to claim 4, wherein the second expansion valve has a temperature-sensing accelerating structure configured to reduce a time constant used to sense a temperature at an outlet side of the external evaporator.

7. An automotive air conditioner according to claim 4, further comprising a differential pressure generating structure used to generate a differential pressure, the differential pressure generating structure being provided downstream of a branched-off passage of the first passage into the bypass passage,
    wherein the second expansion valve has a temperature-sensing accelerating structure configured to reduce a time constant used to sense a temperature at an outlet side of the external evaporator.

8. An automotive air conditioner according to claim 2, further comprising a superheat regulating structure configured to assist in enabling the refrigerant state at the inlet side of the compressor to be brought close to a superheat of 0° C., the superheat regulating structure including a bypass passage that connects a first passage to a second passage, wherein the first passage connects the auxiliary condenser to the external evaporator, and the second passage connects the external evaporator to the compressor.

9. An automotive air conditioner according to claim 8, wherein the bypass passage is so provided as to connect a position downstream of a valve section of the second expansion valve in the first passage to a position downstream of the temperature-sensing section of the second expansion valve in the second passage.

10. An automotive air conditioner according to claim 8, wherein an orifice used to restrict a flow of the refrigerant is provided in the bypass passage.

11. An automotive air conditioner according to claim 8, wherein a superheat control valve is provided in the bypass passage, the superheat control valve sensing a superheat on a side of the second passage so as to adjust the valve opening degree.

12. An automotive air conditioner according to claim 8, further comprising a differential pressure generating structure used to generate a differential pressure, the differential pressure generating structure being provided downstream of a branched-off passage of the first passage into the bypass passage.

13. An automotive air conditioner according to claim 2, wherein the second expansion valve has a temperature-sensing accelerating structure configured to reduce a time constant used to sense a temperature at an outlet side of the external evaporator.

* * * * *